United States Patent Office 3,801,598
Patented Apr. 2, 1974

3,801,598
SUBSTITUTED XANTHONE CARBOXYLIC
ACID COMPOUNDS
Jorg R. Pfister, Los Altos, and Ian T. Harrison and John
H. Fried, Palo Alto, Calif., assignors to Syntex Corporation, Panama, Panama
No Drawing. Filed Aug. 23, 1971, Ser. No. 174,261
Int. Cl. C07d 7/44
U.S. Cl. 260—335                                    25 Claims

ABSTRACT OF THE DISCLOSURE

Compositions containing and methods employing, as the essential ingredient, novel substituted xanthone carboxylic acid compounds which are useful in the treatment of allergic conditions. Methods for preparing these compounds and compositions and intermediates therein are also disclosed. 7-methylsulfinylxanthone-2-carboxylic acid is illustrated as representative of the class.

The present invention is directed to novel substituted xanthone carboxylic acid compounds and to compositions containing and methods utilizing these compounds as the essential ingredient in the treatment of symptoms associated with allergic manifestations, for example, asthmatic conditions.

In a first aspect, the present invention relates to novel C–5 and C–7 substituted xanthone-2-carboxylic acid compounds selected from those represented by the following formulas:

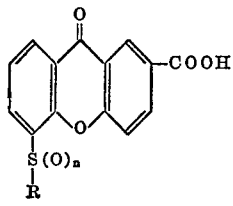

(A)

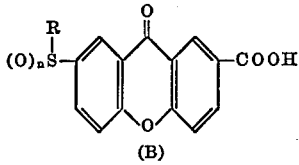

(B)

and the pharmaceutically acceptable, non-toxic esters, amides and salts thereof; wherein $n$ is the integer 1 or 2; R is lower alkyl when $n$ is 1; and R is lower alkyl, hydroxy, amino, monolower alkylamino, or dilower alkylamino when $n$ is 2.

Thus included within the scope of the present invention are:
(1) The C–5 and C–7 lower alkylsulfinyl substituted xanthone-2-carboxylic acid compounds of the following formulas:

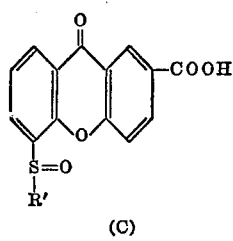

(C)

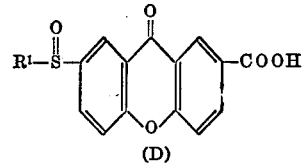

(D)

and the pharmaceutically acceptable, non-toxic esters, amides and salts thereof; wherein each $R^1$ is lower alkyl;

(2) The C–5 and C–7 lower alkylsulfonyl substituted xanthone-2-carboxylic acid compounds of the following formulas:

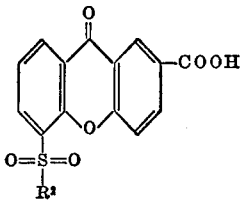

(E)

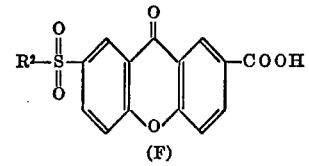

(F)

and the pharmaceutically acceptable, non-toxic esters, amides and salts thereof; wherein each $R^2$ is lower alkyl;

(3) The C–5 and C–7 sulfo substituted xanthone-2-carboxylic acid compounds of the following formulas:

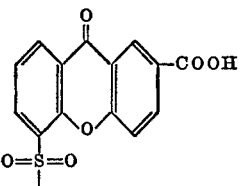

(G)

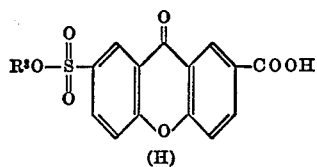

(H)

and the pharmaceutically acceptable, non-toxic esters, amides and salts thereof; wherein each $R^3$ is hydrogen; and (4) The C–5 and C–7 sulfamoyl, N-monolower alkylsulfamoyl, and N,N-dilower alkylsulfamoyl substituted xanthone-2-carboxylic acid compounds of the following formulas:

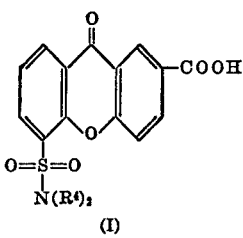

(I)

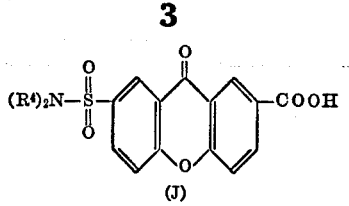

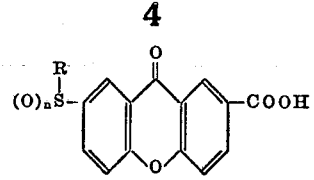

and the pharmaceutically acceptable, non-toxic esters, amides and salts thereof; wherein each R⁴ is hydrogen or lower alkyl.

In a second aspect, the present invention is directed to a method useful for relieving symptoms associated with allergic manifestations such as are brought about by antigen-antibody (allergic) reactions. In the relief of these symptoms, the method hereof serves to inhibit the effects of the allergic reaction when administered in an effective amount. While not intending to be bound by any theoretical mechanism of action, the method hereof is believed to operate by inhibiting the release and/or the action of toxic products, e.g., histamine, 5-hydroxytryptamine, slow releasing substance (SRS-A), and others, which are produced as a result of a combination of specific antibody and antigen (allergic reaction). These properties make the subject compounds particularly useful in the treatment of various allergic conditions.

This aspect of the present invention thus relates to a method useful for inhibiting the effects of the allergic reaction which comprises administering an effective amount of a compound selected from those represented by the following formulas:

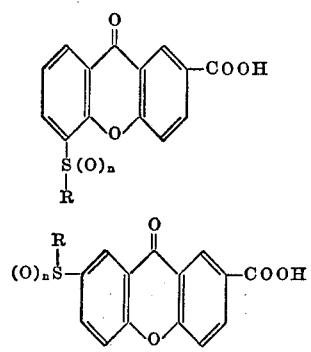

and the pharmaceutically acceptable non-toxic esters, amides, and salts thereof; wherein $n$ is the integer 0 or 1; R is lower alkyl when $n$ is 1; and R is lower alkyl, hydroxy, amino, monolower alkylamino, or dilower alkylamino when $n$ is 2; or a pharmaceutically acceptable non-toxic composition incorporating said acids, esters, amides or salts as an essential ingredient.

The compounds of the present invention are also smooth muscle relaxants, e.g. bronchial dilators, and are therefore useful in the treatment of conditions in which such agents may be indicated, as for instance in the treatment of bronchio constriction. The compounds of the present invention are also vasodilators and are therefore useful in the treatment of conditions in which such agents may be indicated, as for instance in renal and cardiac disorders.

The present invention, in a third aspect, is directed to pharmaceutical compositions useful for inhibiting the effects of the allergic reaction comprising an effective amount of a compound selected from those represented by the following formulas:

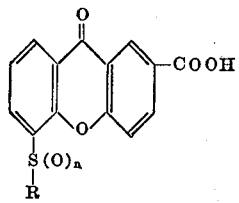

and the pharmaceutically acceptable esters, amides, and salts thereof; wherein $n$ is the integer 0 or 1; R is lower alkyl when $n$ is 1; and R is lower alkyl, hydroxy, amino, monolower alkylamino, or dilower alkylamino when $n$ is 2; in admixture with a pharmaceutically acceptable non-toxic carrier.

In the practice of the method of the present invention, an effective amount of a compound of the present invention or pharmacetuical compositions thereof, as defined above, is administered via any of the usual and acceptable methods known in the art, either singly or in combination with another compound or compounds of the present invention or other pharmaceutical agents, such as antibiotics, hormonal agents, and so forth. These compounds or compositions can thus be administered orally, topically, parenterally, or by inhalation and in the form of either solid, liquid, or gaseous dosage including tablets, suspensions, and aerosols, as discussed in more detail hereinafter. The administration can be conducted in single unit dosage form with continuous therapy or in single dose therapy ad libitum. In the preferred embodiments, the method of the present invention is practiced when relief of symptoms is specifically required, or, perhaps, imminent; however, the method hereof is also usefully practiced as continuous or prophylactic treatment.

In view of the foregoing as well as in consideration of the degree or severity of the condition being treated, age of subject, and so forth, all of which factors being determinable by routine experimentation by one skilled in the art; the effective dosage in accordance herewith can vary over a wide range. Generally, an effective amount ranges from about 0.005 to about 100 mg. per kg. of body weight per day and preferably from about 0.01 to about 100 mg. per kg. of body weight per day. In alternate terms, an effective amount in accordance herewith generally ranges from about 0.5 to about 7000 mg. per day per subject.

Useful pharmaceutical carriers for the preparation of the compositions hereof, can be solids, liquids, or gases. Thus, the compositions can take the form of tablets, pills, capsules, powders, sustained release formulations, solutions, suspensions, elixir, aerosols, and the like. The carrier can be selected from the various oils including those of petroleum, animal, vegetable, or synthetic origin, for example, peanut oil, soybean oil, mineral oil, sesame oil, and the like. Water, saline, aqueous dextrose, and glycols are preferred liquid carriers, particularly for injectable solutions. Suitable pharmaceutical excipients include starch, cellulose, talc, glucose, lactose, sucrose, gelatin, malt, rice, flour, chalk, silica gel, magnesium stearate, sodium stearate, glyceryl monostearate, sodium chloride, dried skim milk, glycerol, propylene glycol, water, ethanol, and the like. Suitable pharmaceutical carriers and their formulation are described in "Remingtons Pharmaceutical Sciences" by E. W. Martin. Such compositions will, in any event, contain an effective amount of the active compound together with a suitable amount of carrier so as to prepare the proper dosage form for proper administration to the host.

The compounds of the present invention demonstrate activity as inhibitors of the effects of the allergic reaction as measured by tests indicative of such activity involving passive cutaneous anaphylaxis as substantially described, for example, by J. Goose et al., Immunology, 16, 749 (1969).
The compounds of the present invention can be prepared in accordance with the following reaction sequence:
Sequence A
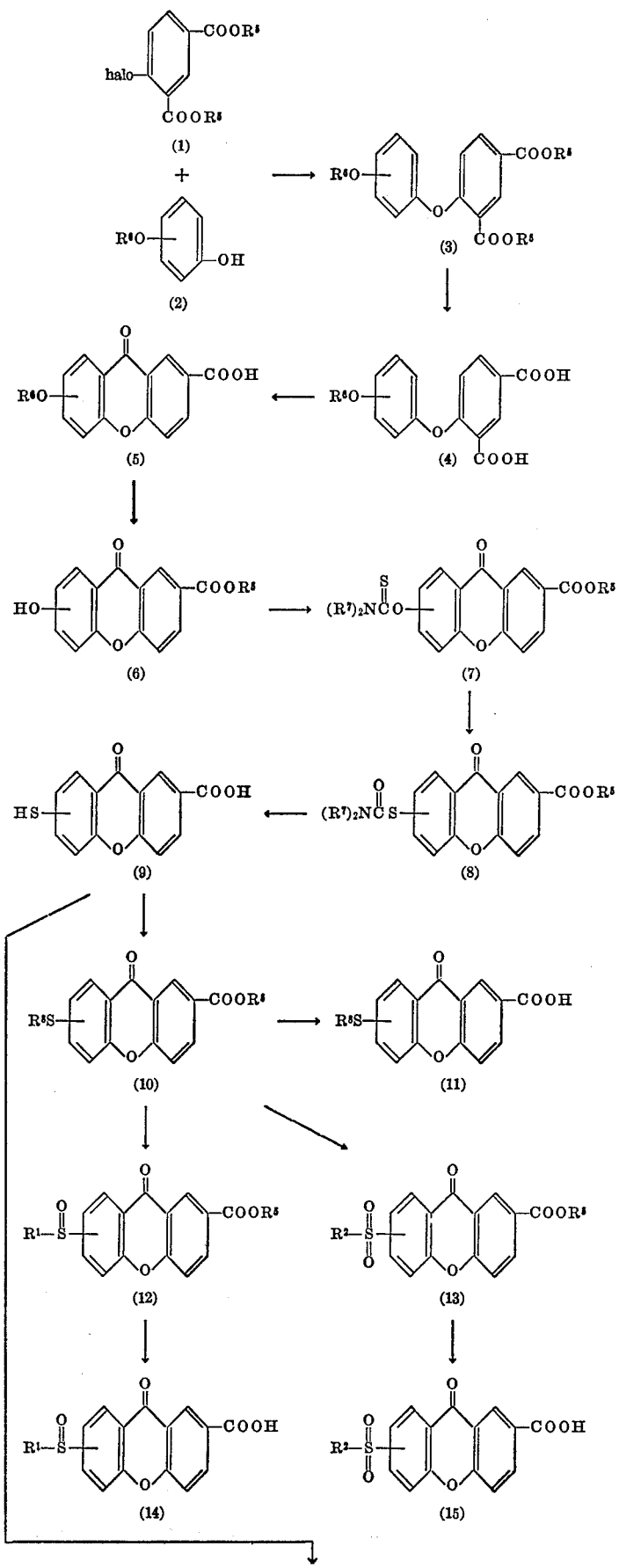

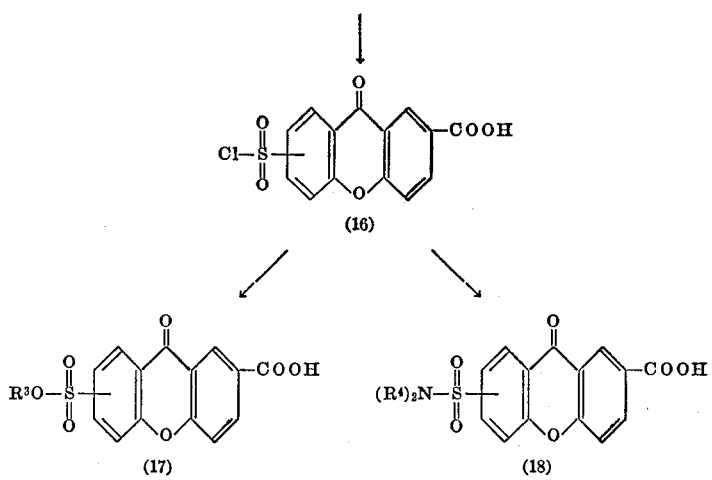

wherein:
each of $R^1$, $R^2$, $R^3$ and $R^4$ is as above defined;
each of $R^5$, $R^7$ and $R^8$ is lower alkyl, $R^5$ and $R^7$ being preferably methyl;
$R^6$ is hydrogen or lower alkyl; and
halo is bromo, chloro, fluoro, or iodo, preferably bromo.

With reference to the above reaction sequence, an ortho or para substituted ($OR^6$) phenol (2) is condensed with the 1,3-dicarbo(lower)alkoxy-4-halobenzene Compound 1 in the presence of cuprous oxide optionally in organic liquid reaction medium, preferably an organic liquid reaction medium, preferably an organic amide such as dimethyl acetamide, dimethylformamide, N-methylpyrrolidone, tetramethylurea, and so forth, to prepare the corresponding 1,3-dicarbo(lower)alkoxy-4-(o- or p-substituted phenyloxy)-benzene Compound 3.

The reaction is preferably conducted in an inert organic reaction medium, such as those listed above, or suitable mixtures of one or more of such media. The reaction is further conducted at temperatures ranging from about 80° to about 220° C., preferably from about 120° to 200° C., and for a period of time sufficient to complete the reaction, ranging from about two hours to about 24 hours.

The reaction consumes the reactants on the basis of one mole of the substituted phenol per mole of the dicarbo-(lower)carboxyhalobenzene per half mole of cuprous oxide. However, the amounts of the reactants to be employed are not critical, some of the desired Compound 3 product being obtained when employing any proportions thereof. In the preferred embodiments, the reaction is conducted by reacting from about one to about three moles of the substituted phenol compound with about from one to about 1.2 moles of the dicarbo(lower)carboxyhalobenzene compound in the presence of from about 0.5 to about 0.6 mole of the cuprous oxide. The inert organic reaction medium, if employed, is used in solvent amounts.

Thereafter, the prepared Compound 3 is base hydrolyzed to give the corresponding 1,3-dicarboxy-4-4(o- or p-substituted phenyloxy)-benzene (4). The base hydrolysis conditions can be any employed conventionally in the art. Generally, the hydrolysis reaction is conducted using an alkali metal hydroxide at about 50° to about 90° C. and for a period of time sufficient to complete the reaction, ranging from about 15 minutes to about 60 minutes, preferably in the presence of inert organic reaction media such as those normally employed in organic chemical reactions of this type, e.g., aqueous alkanol solutions. Although two moles of base are required per mole of Compound 3, the amounts employed are not critical to produce the desired hydrolysis. Preferably from about three to about five moles of base are employed per mole of Compound 3 and the reaction media, if employed, is used in solvent amounts.

The thus prepared diacid Compound 4 is then cyclized with phosphoryl chloride, thionyl, chloride, sulfuric acid, hydrogen fluoride, or, preferably, polyphosphoric acid (PPA), to give the corresponding 5- or 7-substituted xanthone-2-carboxylic acid Compound 5. The reaction is preferably, but optionally, conducted in an inert organic reaction medium including those usually employed in organic chemical reactions, such as dimethylsulfoxide, sulfolane, benzene, toluene, and so forth. The reaction is further conducted at temperatures ranging from about 60° to about 180° C., and for a period of time sufficient to complete the reaction ranging from about 15 minutes to about 90 minutes.

Although the reaction consumes the reactants on the basis of one mole of Compound 4 per mole of cyclizing reagent, the reaction can be performed using any proportions of reactants. In the preferred embodiments, however, the reaction is conducted using from about 20 to about 50 moles of the cyclizing reagent per mole of starting Compound 4.

The 5- and 7-lower alkoxyxanthone-2-carboxylic acid compounds (5; $R^6$=lower alkyl) thus prepared are converted to the respective 5- and 7-hydroxy compounds (5; $R^6$=hydrogen) by treatment with hydrobromic or hydroiodic acid and acetic acid. This reaction is conducted at a temperature of from about 100° to about 160° C. The thus prepared 5- and 7-hydroxy acid compounds are then esterified ($R^5$) to give Compounds 6. This reaction is conducted with ethereal diazoalkane such as diazomethane and diazoethane or with the desired lower alkyl iodide in the presence of lithium carbonate at room temperature or with the desired lower alkanol in the presence of a trace of sulfuric acid at reflux.

The hydroxy acid esters (6) are then treated with a dialkylthiocarbamoyl chloride, such as dimethylthiocarbamoyl chloride, in the presence of base, such as an alkali metal hydride, and in organic liquid reaction media, preferably an organic amide such as those listed above with respect to reaction (1+2→3) to afford the products (7). The reaction is conducted at temperatures ranging from about 20° to about 100° C., preferably from 60° to about 80° C. and for a period of time sufficient to complete the reaction, ranging from about 1 hour to about 6 hours. In the preferred embodiments, the reaction is conducted by reaction of from about 1.1 to about 1.5 moles of dialkylthiocarbamoyl chloride per mole of Compound 6.

The product Compounds 7 are then rearranged by reaction at a temperature of from about 200° to about 250° C., preferably from about 220° to about 230° C., and for a period of time ranging from about 1 hour to about 8 hours and in the presence of organic medium such as sulfolane, nitrobenzene, triethyleneglycol, and so forth, which is preferably employed in solvent amounts, to give Compound 8.

Compounds 8 are then converted to the corresponding 5- and 7-mercapto acid Compounds 9 by base hydrolysis such as those described above for the preparation of Compounds 4 from 3. The 5- and 7-lower alkylthio ether, ester Compounds 10 are then prepared as described above (e.g., 5→6) or by reacting Compounds 9 with a lower alkyl halide in the presence of base such as potassium carbonate and organic liquid reaction media such as those described above. The reaction is conducted at a temperature ranging from about 20° to about 80° C., preferably from 50° to about 60° C. and for a period of time sufficient to complete the reaction, ranging from about 2 hours to about 16 hours.

Hydrolysis of the ester (10), as described above (e.g., 3→4), affords the 5-and 7-(lower alkylthio)-acid Compounds 11.

Compound 10 can be oxidized with a peracid, such as peracetic acid, m-chloroperbenzoic acid, p-nitroperbenzoic acid, perphthalic acid, and so forth, to give Compounds 12 which can be hydrolyzed, as above described, to give the corresponding 5- and 7-lower alkyl-sulfinyl acid Compounds 14. The oxidation is preferably conducted in liquid reaction media such as a chlorinated hydrocarbon, e.g. chloroform, methylene chloride, and carbon tetrachloride. The reaction is conducted at temperatures ranging from about 0° to about 60° C., preferably from 20° to about 30° C. and for a period of time sufficient to complete the reaction, ranging from about 1 hour to about 6 hours. In the preferred embodiments, the reaction is conducted by reaction of from about 1 to about 1.1 moles of peracid.

Alternatively, Compound 10 are oxidized with excess hydrogen peroxide to give Compounds 13 which can be hydrolyzed as above described to give the 5- and 7-lower alkylsulfonyl acid Compounds 15. The peroxide oxidation is preferably conducted in liquid reaction media such as a lower carboxylic acid, e.g. acetic acid and propionic acid. The reaction is further conducted at temperatures ranging from about 20° to about 100° C. preferably from 80° to about 90° C. and for a period of time sufficient to complete the reaction, ranging from about 30 minutes to about 3 hours. In the preferred embodiments, the reaction is conducted by reaction of from about 5 to about 10 moles of hydrogen peroxide per mole of Compound 10.

In said oxidation steps, and particularly that employing peracid, a mixture of products (12) and (13) may be obtained. If obtained, the mixture can be conventionally separated, such as via chromatography, if desired, to isolate the oxidized products.

The above oxidation steps can also be practiced on starting Compounds 11 to give respective products (14) or (15) without the need of a second hydrolysis step.

Alternatively, Compounds 9 can be treated with excess chlorine under acidic conditions to afford Compounds 16. This reaction is conducted employing a pH of about 1 by use of hydrochloric acid, optionally in acetic acid solution. The reaction is further conducted at temperatures ranging from about 20° to about 100° C., preferably from 50° to about 60° C. and for a period of time sufficient to complete the reaction, ranging from about 2 hours to about 12 hours.

Compound 16 is then reacted with a base, such as alkali metal hydroxide, preferably under aqueous conditions and at a temperature ranging from about 20° to about 100° C., preferably from 80° to about 90° C. and for a period of from about 1 hour to about 2 hours to give the 5- and 7-sulfosubstituted acid Compounds 17.

Compound 16 can be treated with ammonia, monolower alkylamine, or dilower alkylamine to give the 5- and 7-sulfamoyl, monolower alkylsulfamoyl, and dilower alkylsulfamoyl acid Compounds 18. This reaction is conducted at temperatures ranging from about 0° to about 80° C., preferably from 20° to about 30° C., and for a period of time sufficient to complete the reaction, ranging from about 1 hour to about 8 hours. In the preferred embodiments, the reaction is conducted by reaction of from about 10 to about 20 moles of amine per mole of Compound 16. This reaction is further conducted in organic reaction media such as those described above, preferably tetrahydrofuran, dioxane, dimethylsulfoxide, and so forth.

The C-5 and C-7 chlorosulfonylxanthone-2-carboxylic acid Compounds 16 are novel intermediates useful as described above.

Alternatively, certain of the compounds of the present invention can be prepared in accordance with the following:

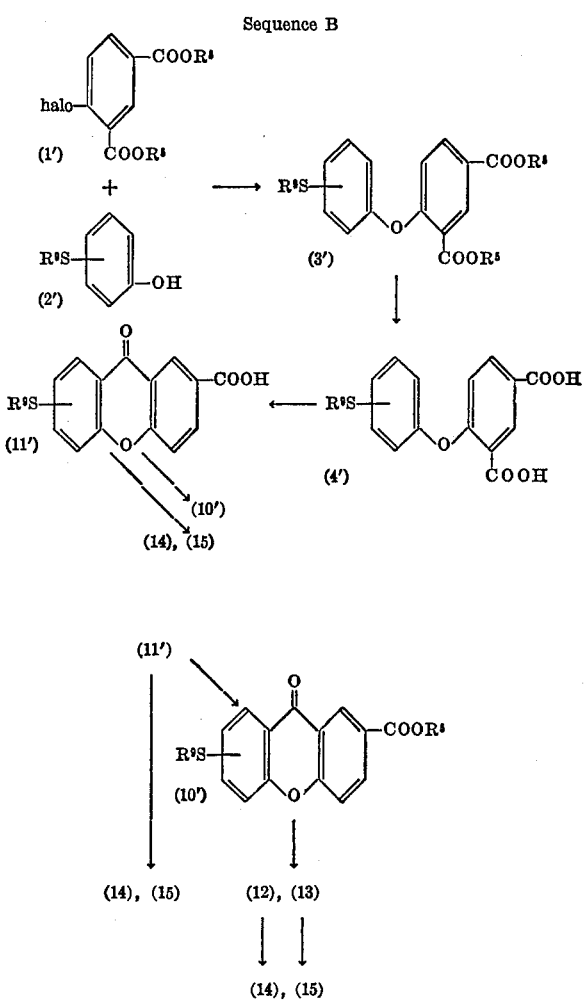

wherein $R^9$ is lower alkyl.

With reference to above Sequence B, the alkylthiophenols (2') otherwise corresponding to Compounds 2 are condensed with Compound 1, as above described, to give the alkylthio adduct (3'). This compound is then treated as depicted and described above with reference to Sequence A to give the diacid compound (4') and the (alkylthio)-xanthone-2-carboxylic acid (5') which can be converted to the sulfinyl and sulfonyl Compounds 12, 13, 14 and 15.

An alternative method for the preparation of the intermediate 5- and 7-hydroxy and -lower alkoxy Compounds 5 hereof is represented as follows:

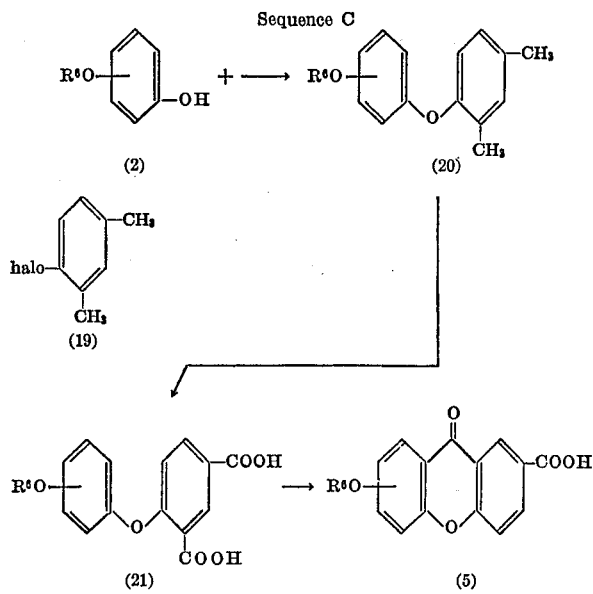

wherein $R^6$ and halo are as defined above.

With reference to Sequence C, an appropriate phenol (2) is treated with 1,3-dimethyl-4-halo- (preferably iodo) benzene (19), as described above, to prepare the corresponding 1,3-dimethyl-4-phenyloxybenzene (20). This compound is then oxidized such as with potassium permanganate in aqueous t-butanol to give Compound 21. This compound is then cyclized, as described above, to give the corresponding xanthone-2-carboxylic acid (5) which can be treated as described above, to prepare the compounds of the present invention.

The acid esters of the xanthone-2-carboxylic acids hereof are prepared as described above (e.g., 5→6). In the sulfo series, the carboxylic acid esters are preferably prepared with the desired lower alkanol in the absence of acid catalyst.

The amides of the xanthone-2-carboxylic acids hereof are prepared by treatment of the acids with thionyl chloride followed by treatment with anhydrous ammonia or lower alkyl or dilower alkyl amine. In the lower alkyl sulfinyl series, the carboxylic acid amides are preferably prepared at the corresponding (lower alkylthio) stage followed by oxidation thereof, as described above.

The salts of the xanthone-2-carboxylic acids hereof are prepared by treating the corresponding acids with pharmaceutically acceptable base. Representative salts derived from such pharmaceutically acceptable bases include the sodium, potassium, lithium, ammonia, calcium, magnesium, ferrous, ferric, zinc, manganous, aluminum, manganic, trimethylamine, triethylamine, tripropylamine, β-(dimethylamino)ethanol, triethanolamine, β-(diethylamino)ethanol, arginine, lysine, histidine, N-ethylpiperidine, hydrabamine, chlorine, betaine, ethylenediamine, glucosamine, methyl glucamine, theobromine, purines, piperazine, piperidine, polyamine resins, caffeine, procaine salts. The reaction is conducted in an aqueous solution, alone or in combination with an inert, water miscible organic solvent, at a temperature of from about 0° C. to about 100° C., preferably at room temperature. Typical inert, water miscible organic solvents include methanol, ethanol, isopropanol, butanol, acetone, dioxane, or tetrahydrofuran. When divalent metal salts are prepared, such as the calcium salts or magnesium salts of the acids the free acid starting material is treated with about one molar equivalent of pharmaceutically acceptable base.

When the aluminum salts of the acids are prepared, about one molar equivalent of the pharmaceutically acceptable base are employed.

In the preferred embodiment of the present invention, the calcium salts and magnesium salts of the acids are prepared by treating the corresponding sodium or potassium salts of the acids with at least one molar equivalent of calcium chloride or magnesium chloride, respectively, in an aqueous solution, alone or in combination with an inert water miscible organic solvent, at a temperature of from about 20° C. to about 100° C.

In the preferred embodiment of the present invention, the aluminum salts of the acids are prepared by treating the acids with at least one molar equivalent of an aluminum alkoxide, such as aluminum triethoxide, aluminum tripropoxide, and the like, in a hydrocarbon solvent, such as benzene, xylene, cyclohexane, and the like at a temperature of from 20° C. to about 115° C.

In the sulfo series, use of one equivalent of base provides the sulfo acid monosalts; use of two equivalents provides the disalts.

In the present specification and claims, by the term "lower alkyl" is intended a lower alkyl group containing 1 to 5 carbon atoms including straight and branched chain groups and cyclic alkyl groups, for example, methyl, ethyl, n-propyl, isopropyl, n-butyl, isobutyl, sec-butyl, t-butyl, n-pentyl, isopentyl, sec-pentyl, t-pentyl, cyclopropyl, cyclobutyl, and cyclopentyl. By the term "lower alkoxy" is intended the group "o-lower alkyl" wherein "lower alkyl" is as defined above.

By the term "pharmaceutically acceptable, non-toxic esters, amides, and salts" is respectively intended a "lower alkyl" ester, "lower alkyl" being as defined above; an unsubstituted, mono(lower)alkyl, or (di)lower alkyl substituted amide, "lower alkyl" being as defined above; and a salt as defined above.

In the lower alkyl sulfinyl series, the compounds possess a chiral center. The methods hereof generate each of the d and l and dl forms and each is thus included within the scope hereof. If desired, the isomers can be separated by conventional means such as forming the alkaloid salts of the products and employing fractional crystallization.

The nomenclature herein is employed in accordance with Chemical Abstracts 56 Subject Index (1962, January-June).

The following examples illustrate the method by which the present invention can be practiced.

EXAMPLE 1

A mixture of 4.188 g. of 1,3-dicarbomethoxy-4-bromobenzene, 2.85 g. of p-methoxyphenol, 1.32 g. of cuprous oxide in 20 ml. of dimethylacetamide is heated to 160° C. and maintained thereat with stirring and under a nitrogen atmosphere. After monitoring via t.l.c. indicates the reaction is substantially complete, the reaction mixture is diluted with water and extracted with diethylether:methylene chloride (3:1). The extracts are chromatographed on 150 g. of alumina and the uniform fractions combined to give 1,3 - dicarbomethoxy - 4-(p-methoxyphenyloxy) benzene.

1,3 - dicarbomethoxy-4-(p-methoxyphenyloxy)-benzene (3 g.) is combined with 150 ml. of 5% potassium hydroxide in methanol. The resultant mixture is refluxed for 1 hour after which time it is acidified, cooled, and filtered, to give 1,3-dicarboxy-4-(p-methoxyphenyloxy)-benzene.

Two grams of 1,3-dicarboxy-4-(p-methoxyphenyloxy)-benzene in 20 ml. of concentrated sulfuric acid is stirred at 80° C. for 1 hour. After this time, the reaction mixture is poured into 200 ml. of ice water and the resultant mixture is heated on a steam bath for 15 minutes. The mixture is cooled and filtered with the precipitate being washed with water and then recrystallized from acetic acid to give 7-methoxyxanthone-2-carboxylic acid.

The foregoing procedure can be practiced using an alternate 1,3 - dicarboloweralkoxy-4-halo starting compound, such as 1,3-dicarbomethoxy-4-chloro- (or iodo) benzene, 1,3-dicarboethoxy-4-fluoro-benzene, 1,3-dicarboethoxy-4-bromobenzene, and the like, with similar results. Likewise, the foregoing procedure can be practiced using an alternate 4-lower alkoxyphenol starting compound to prepare the corresponding 7-lower alkoxyxanthone-2-carboxylic acids,
7-lower alkoxyxanthone-2-carboxylic acids, e.g.
7-ethoxyxanthone-2-carboxylic acid,
7-n-propoxyxanthone-2-carboxylic acid,
7-isopropoxyxanthone-2-carboxylic acid,
7-n-butoxyxanthone-2-carboxylic acid,
7-isobutoxyxanthone-2-carboxylic acid,
7-sec-butoxyxanthone-2-carboxylic acid,
7-t-butoxyxanthone-2-carboxylic acid,
7-n-pentyloxyxanthone-2-carboxylic acid, and
7-cyclopentyloxyxanthone-2-carboxylic acid.

Likewise prepared are the corresponding C–5 substituted compounds, i.e. 5-methoxyxanthone-2-carboxylic acid, 5-ethoxyxanthone-2-carboxylic acid, 5-n-propoxyxanthone-2-carboxylic acid, and so forth.

The foregoing procedure can also be practiced upon the corresponding 4-(loweralkylthio)-phenol starting compounds to prepare the corresponding C–5 and C–7 (lower alkylthio) substituted compounds, i.e.

7-(methylthio-xanthone-2-carboxylic acid,
5-(methylthio)-xanthone-2-carboxylic acid,
7-(ethylthio)-xanthone-2-carboxylic acid,
5-(ethylthio)-xanthone-2-carboxylic acid,
7-(n-propylthio)-xanthone-2-carboxylic acid,
5-(n-propylthio)-xanthone-2-carboxylic acid,
7-(isopropylthio)-xanthone-2-carboxylic acid,
5-(isopropylthio)-xanthone-2-carboxylic acid,
7-(n-butylthio)-xanthone-2-carboxylic acid,
5-(n-butylthio)-xanthone-2-carboxylic acid,
7-(isobutylthio)-xanthone-2-carboxylic acid,
5-(isobutylthio)-xanthone-2-carboxylic acid,
7-(sec-butylthio)-xanthone-2-carboxylic acid,
5-(sec-butylthio)-xanthone-2-carboxylic acid,
7-(t-butylthio)-xanthone-2-carboxylic acid,
5-(t-butylthio)-xanthone-2-carboxylic acid,
7-(n-pentylthio)-xanthone-2-carboxylic acid,
5-(n-pentylthio)-xanthone-2-carboxylic acid,
7-(cyclopentylthio)-xanthone-2-carboxylic acid, and
5-(cyclopentylthio)-xanthone-2-carboxylic acid.

EXAMPLE 2

The procedures of Example 1 are repeated using o-hydroxyphenol and p-hydroxyphenol as starting compounds to respectively prepare 5-hydroxyxanthone-2-carboxylic acid and 7-hydroxyxanthone-2-carboxylic acid.

Alternatively, the hydroxy compounds can be prepared from the lower alkoxy compounds of Example 1 according to the following representative procedure.

EXAMPLE 3

A mixture of 11 grams of 7-methoxyxanthone-2-carboxylic acid in 100 ml. of concentrated aqueous hydrogen iodide and 100 ml. of acetic acid is refluxed for 4 hours. After this time, the mixture is cooled, diluted with water, and filtered. The precipitate is washed and dried to give 7-hydroxyxanthone-2-carboxylic acid.

EXAMPLE 4

A mixture of 4 grams of 7-hydroxyxanthone-2-carboxylic acid, 10 g. of methyl iodide, and 10 g. of lithium carbonate in 50 ml. of dimethylformamide is stirred at room temperature for a period of 16 hours. After this period of time, the reaction mixture is poured into dilute hydrochloric acid-ice and the resultant mixture extracted with ethyl acetate. The extracts are filtered through alumina to give methyl 7-hydroxyxanthone-2-carboxylate which can be recrystallized from methanol.

EXAMPLE 5

To a solution of 6.2 g. of methyl 7-hydroxyxanthone-2-carboxylate in 10 ml. of dimethylformamide are added 1 g. of sodium hydride. The mixture is stirred for 10 minutes at room temperature under nitrogen. Dimethylthiocarbamoyl chloride (3 g.) is then added thereto and the resultant mixture stirred at 70° C. for 6 hours and then at room temperature for 16 hours. The mixture is then poured into 200 ml. of water containing 1 ml. of acetic acid, the resultant mixture is filtered and the solid dried to give methyl 7-dimethylthiocarbamoyloxyxanthone-2-carboxylate.

Methyl 7 - dimethylthiocarbamoyloxyxanthone - 2 - carboxylate (8 g.) in 150 ml. of sulfolane is stirred at 230° C. under nitrogen. After a total of 6 hours under these conditions, t.l.c. indicates the absence of starting material. The mixture is cooled to 80° C. and 150 ml. of hot water are slowly added. The mixture is then cooled and the filtered solid washed with water and dried to give methyl 7 - (dimethylcarbamoylthio) - xanthone-2-carboxylate.

Methyl 7-(dimethylcarbamoylthio)-xanthone-2-carboxylate (7.5 g.), 10 g. of potassium hydroxide and 250 ml. of 80% aqueous ethanol is refluxed for 1 hour. After this time, 250 ml. of water are added and the mixture is treated with charcoal, filtered, acidified. The product is filtered off and dried to give 7-mercaptoxanthone-2-carboxylic acid.

In like manner, 5-mercaptoxanthone-2-carboxylic acid is prepared from methyl 5-hydroxanthone-2-carboxylate.

EXAMPLE 6

A mixture of 3 g. of 7-mercaptoxanthone-2-carboxylic acid in 150 ml. of dimethylformamide, 5 ml. of methyl iodide and 5 ml. of potassium carbonate is stirred for 16 hours at 60° C. The mixture is then poured into dilute hydrochloric acid and the resultant mixture extracted with ethyl acetate. The extracts are chromatographed on alumina (methylene chloride) to give methyl 7-(methylthio)-xanthone-2-carboxylate (i.e. methyl 7-thiomethoxyxanthone-2-carboxylate) which can be recrystallized from methylene chloride/methanol.

A mixture of 580 mg. of methyl 7-(methylthio)-xanthone-2-carboxylate, 30 ml. of ethanol, 5 ml. of saturated sodium carbonate solution and 5 ml. of water is refluxed for 1 hour. The mixture is then cooled, acidified and the precipitate filtered off to give 7-(methylthio)-xanthone-2-carboxylic acid (i.e. 7-thiomethoxyxanthone-2-carboxylic acid) as also prepared in the alternative method described in Example 1.

A mixture of 0.8 g. of 7-mercaptoxanthone-2-carboxylic acid, 2 ml. of 2-bromopropane, and excess potassium carbonate in 50 ml. of dimethylformamide is stirred for 24 hours at 75° C. Dilute hydrochloric acid and ethanol are added, the solid filtered off and washed. The solid is saponified with sodium carbonate in aqueous methanol (30 minutes reflux). The alkaline solution is diluted with water, treated with charcoal, filtered, and acidified to give 7-(isopropylthio)-xanthone-2-carboxylic acid which can be recrystallized from tetrahydrofuran/ethayl acetate.

In a similar manner (and alternative to the method of Example 1), the following are prepared from the respective starting compounds:

5-(methylthio)-xanthone-2-carboxylic acid,
5-(isopropylthio)-xanthone-2-carboxylic acid,
7-(ethylthio)-xanthone-2-carboxylic acid,
5-(ethylthio)-xanthone-2-carboxylic acid,
7-(n-propylthio)-xanthone-2-carboxylic acid,
5-(n-propylthio)-xanthone-2-carboxylic acid,
7-(n-butylthio)-xanthone-2-carboxylic acid,
5-(n-butylthio)-xanthone-2-carboxylic acid,
7-(sec-butylthio)-xanthone-2-carboxvlic acid,
5-(sec-butylthio)-xanthone-2-carboxvlic acid,
7-(isobutylthio)-xanthone-2-carboxylic acid, 5-(isobutylthio)-xanthone-2-carboxylic acid,
7-(t-butylthio)-xanthone-2-carboxylic acid,
5-(t-butylthio)-xanthone-2-carboxylic acid,
7-(n-pentylthio)-xanthone-2-carboxylic acid,
5-(n-pentylthio)-xanthone-2-carboxylic acid,
7-(cyclopentylthio)-xanthone-2-carboxylic acid, and
5-(cyclopentylthio)-xanthone-2-carboxylic acid.

EXAMPLE 7

Methyl 7-(methylthio)-xanthone-2-carboxylate (764 mg.), 2 ml. of hydrogen peroxide (30%), and 40 ml. of acetic acid are heated on the steam bath (80° C.) for 90 minutes. T.l.c. indicates the absence of starting material. The mixture is diluted with 60 ml. of hot water, and the mixture is cooled, the solid is filtered off and dried to give methyl 7 - methylsulfonylxanthone - 2 - carboxylate which can be recrystallized from acetic acid/water.

Methyl 7-methylsulfonylxanthone-2-carboxylate (660 mg.), 1 g. of potassium hydroxide, and 60 ml. of 80% aqueous ethanol are refluxed for 30 minutes. The mixture is filtered, acidified, and the solid filtered off to give 7-methylsulfonylxanthone-2-carboxylic acid.

In like manner, 5-methylsulfonylxanthone-2-carboxylic acid is prepared.

Likewise, from the respective starting compounds are prepared the following compounds:

7-isopropylsulfonylxanthone-2-carboxylic acid,
5-isopropylsulfonylxanthone-2-carboxylic acid,
7-ethylsulfonylxanthone-2-carboxylic acid,
5-ethylsulfonylxanthone-2-carboxylic acid,
7-n-propylsulfonylxanthone-2-carboxylic acid,
5-n-propylsulfonylxanthone-2-carboxylic acid,
7-n-butylsulfonylxanthone-2-carboxylic acid,
5-n-butylsulfonylxanthone-2-carboxylic acid,
7-sec-butylsulfonylxanthone-2-carboxylic acid,
5-sec-butylsulfonylxanthone-2-carboxylic acid,
7-isobutylsulfonylxanthone-2-carboxylic acid,
5-isobutylsulfonylxanthone-2-carboxylic acid,
7-t-butylsulfonylxanthone-2-carboxylic acid,
5-t-butylsulfonylxanthone-2-carboxylic acid,
7-n-pentylsulfonylxanthone-2-carboxylic acid,
5-n-pentylsulfonylxanthone-2-carboxylic acid,
7-cyclopentylsulfonylxanthone-2-carboxylic acid, and
5-cyclopentylsulfonylxanthone-2-carboxylic acid.

EXAMPLE 8

Methyl 7-(methylthio)-xanthone-2-carboxylate (927 mg.) in 60 ml. of methylene chloride is cooled to 0° C. (ice). m-Chloroperbenzoic acid (555 mg.) is then added and the mixture is stirred at 0° C. for 75 minutes. The reaction mixture is then filtered through alumina and washed with methylene chloride to give methyl 7-methylsulfinylxanthone-2-carboxylate which can be recrystallized from benzene/heptane.

Methyl 7-methylsulfinylxanthone-2-carboxylate (720 mg.), 75 ml. of ethanol, and 10 ml. of 5% sodium hydroxide are refluxed for 30 minutes. The mixture is cooled, partially evaporated and acidified. The precipitate is off, washed and dried to give 7-methylsulfinylxanthone-2-carboxylic acid which can be recrystallized from acetic acid.

In like manner, 5-methylsulfinylxanthone-2-carboxylic acid is prepared.

Likewise from the respective starting compounds are prepared the following compounds:

7-isopropylsulfinylxanthone-2-carboxylic acid,
5-isopropylsulfinylxanthone-2-carboxylic acid,
7-ethylsulfinylxanthone-2-carboxylic acid,
5-ethylsulfinylxanthone-2-carboxylic acid,
7-n-propylsulfinylxanthone-2-carboxylic acid,
5-n-propylsulfinylxanthone-2-carboxylic acid,
7-n-butylsulfinylxanthone-2-carboxylic acid,
5-n-butylsulfinylxanthone-2-carboxylic acid,
7-sec-butylsulfinylxanthone-2-carboxylic acid,
5-sec-butylsulfinylxanthone-2-carboxylic acid,
7-isobutylsulfinylxanthone-2-carboxylic acid,
5-isobutylsulfinylxanthone-2-carboxylic acid,
7-t-butylsulfinylxanthone-2-carboxylic acid,
5-t-butylsulfinylxanthone-2-carboxylic acid,
7-n-pentylsulfinylxanthone-2-carboxylic acid,
5-n-pentylsulfinylxanthone-2-carboxylic acid,
7-cyclopentylsulfinylxanthone-2-carboxylic acid, and
5-cyclopentylsulfinylxanthone-2-carboxylic acid.

The procedures of Examples 7 and 8 can be practiced upon the corresponding acid starting compounds to give the same products without the need of the hydrolysis step.

EXAMPLE 9

One gram of 7-mercaptoxanthone-2-carboxylic acid is dissolved in 30 ml. of acetic acid containing 3 ml. of concentrated hydrochloric acid under warming. The solution is then saturated with chlorine gas and stirred at room temperature overnight. The solution is then diluted with water and the precipitate filtered off, washed, and dried to give 7-chlorosulfonylxanthone-2-carboxylic acid.

Likewise, 5-chlorosulfonylxanthone-2-carboxylic acid is prepared from 5-mercaptoxanthone-2-carboxylic acid.

The thus prepared chlorosulfonyl compounds are then treated with aqueous potassium hydroxide to give 7-sulfoxanthone-2-carboxylic acid and 5-sulfoxanthone-2-carboxylic acid.

EXAMPLE 10

A mixture of 1 g. of 7-chlorosulfonylxanthone-2-carboxylic acid, 2 ml. of concentrated aqueous ammonia, and 20 ml. of dioxane is stirred at room temperature overnight. The mixture is then diluted with water and the solid filtered off and dried to give 7-sulfamoylxanthone-2-carboxylic acid.

In like manner, 5-sulfamoylxanthone-2-carboxylic acid is prepared.

Upon substituting a primary amine, such as methylamine and ethylamine, or a secondary amine, such as dimethylamine and diethylamine, for ammonia in the above method, the corresponding C–5 and C–7 N-mono-lower alkylsulfamoyl and N,N-dilower alkylsulfamoyl products are obtained, e.g.:

7-methylsulfamoylxanthone-2-carboxylic acid,
5-methylsulfamoylxanthone-2-carboxylic acid,
7-ethylsulfamoylxanthone-2-carboxylic acid,
5-ethylsulfamoylxanthone-2-carboxylic acid,
7-n-propylsulfamoylxanthone-2-carboxylic acid,
5-n-propylsulfamoylxanthone-2-carboxylic acid,
7-isopropylsulfamoylxanthone-2-carboxylic acid,
5-isopropylsulfamoylxanthone-2-carboxylic acid,
7-dimethylsulfamoylxanthone-2-carboxylic acid,
5-dimethylsulfamoylxanthone-2-carboxylic acid,
7-diethylsulfamoylxanthone-2-carboxylic acid,
5-diethylsulfamoylxanthone-2-carboxylic acid,
7-di-n-propylsulfamoylxanthone-2-carboxylic acid,
5-di-n-propylsulfamoylxanthone-2-carboxylic acid,
7-di-isopropylsulfamoylxanthone-2-carboxylic acid,
5-di-isopropylsulfamoylxanthone-2-carboxylic acid, and so forth.

EXAMPLE 11

A mixture of 51.5 g. of 1,3-dimethyl-4-iodobenzene (4-iodo-m-xylene), 40 g. of p-methoxyphenol, 16 g. of cuprous oxide in 300 ml. of dimethylacetamide is heated to the boiling point and maintained under reflux (190° C.) for 144 hours with stirring and under a nitrogen atmosphere. The reaction mixture is then poured into ice water and extracted with ether and the extracts are filtered through 500 g. of alumina in hexane to give 1,3-dimethyl-4-(p-methoxyphenyloxy)-benzene.

A mixture of 41 g. of 1,3-dimethyl - 4 - (p - methoxyphenyloxy)-benzene, 300 g. of potassium permanganate, 500 ml. of t-butanol, and 750 ml. of water is heated to the boiling point and maintained thereat for a period of 3 hours. After distilling off the t-butanol, the reaction mixture is filtered, the clear filtrate acidified and the precipitate of 1,3-dicarboxy - 4 - (p - methoxyphenyloxy)-benzene is isolated by suction filtration and washed with water.

The 1,3-dicarboxy-4-(p - methoxyphenyloxy) - benzene thus prepared is then cyclized as described in Example 1 or 12 to give 7-methoxyxanthone-2-carboxylic acid which can be converted to 7-hydroxyxanthone-2-carboxylic acid.

In a similar manner, the foregoing procedure can be practiced utilizing other p-lower alkoxyphenol or p-lower alkylthiophenol starting compounds to prepare the corresponding products, for example, 7 - (methylthio)-xanthone-2-carboxylic acid, 7-ethoxyxanthone - 2 - carboxylic acid, 7-(ethylthio)-xanthone - 2 - carboxylic acid, 7-n-propoxyxanthone - 2 - carboxylic acid, 7 - (n - propylthio)-xanthone-2-carboxylic acid, 7 - isopropoxyxanthone-2-carboxylic acid, 7-(isopropylthio) - xanthone - 2 - carboxylic acid, 7-n-butoxyxanthone - 2 - carboxylic acid, 7-(n-butylthio)-xanthone-2-carboxylic acid, and so forth, which can each be converted to 7-hydroxyxanthone-2-carboxylic acid.

These compounds can then be treated as described in Examples 4 to 10 to prepare the corresponding 7-substituted compounds of the present invention.

EXAMPLE 12

A mixture of 1,3-dimethyl-4-bromobenzene, 10.5 g. of o-methoxyphenol, 4.65 g. of cuprous oxide, 40 ml. of tetramethylurea, and 75 ml. of N-methylpyrrolidone is stirred at 165° for 96 hours. The resultant mixture is diluted with water and extracted with methylene chloride. The methylene chloride extracts are chromatographed on 300 g. of alumina with gradient elution using hexane:ether to give 1,3-dimethyl-4-(o-methoxyphenyloxy)-benzene.

A mixture of 12 g. of 1,3-dimethyl-4-(o-methoxyphenyloxy)-benzene, 72 g. of potassium permanganate, 200 ml. of t-butanol and 350 ml. of water is refluxed for 4½ hours. After this time, the t-butanol is distilled off, and the reaction mixture is filtered. The filtrate is acidified to give 1,3-dicarboxy-4-(o-methoxyphenyloxy) - benzene which can be recrystallized from benzene:heptane.

A mixture of 3 g. of 1,3-dicarboxy-4-(o-methoxyphenyloxy)-benzene, 75 ml. of polyphosphoric acid, and 75 ml. of sulfolane is stirred at 125° C. for a period of 2 hours. After this time, the reaction mixture is poured into water, filtered and the precipitate washed. The precipitate is recrystallized from acetic acid (charcoal) to give 5-methoxyxanthone-2-carboxylic acid which can be converted to 5-hydroxyxanthone-2-carboxylic acid.

In a similar manner, the foregoing procedure can be practiced utilizing other o-lower alkoxyphenol or o-lower alkylthiophenol starting compounds to prepare the corresponding products, for example, 5-(methylthio)-xanthone-2-carboxylic acid,
5-ethoxyxanthone-2-carboxylic acid,
5-(ethylthio)-xanthone-2-carboxylic acid,
5-n-propoxyxanthone-2-caboxylic acid,
5-(n-propylthio)-xanthone-2-carboxylic acid,
5-isopropoxyxanthone-2-carboxylic acid,
5-(isopropylthio)-xanthone-2-carboxylic acid,
5-n-butoxyxanthone-2-carboxylic acid,
5-(n-butylthio)-xanthone-2-carboxylic acid, and so forth, which can each be converted to 5-hydroxyxanthone-2-carboxylic acid.

These compounds can then be treated as described in Examples 4 to 10 to prepare the corresponding 5-substituted compounds of the present invention.

EXAMPLE 13

A mixture of 4.5 g. of 7 - methylsulfinylxanthone - 2-carboxylic acid, 10 g. of methyl iodide, and 10 g. of lithium carbonate in 75 ml. of dimethylformamide is stirred at room temperature for a period of 18 hours. After this period of time, the reaction mixture is poured into dilute hydrochloric acid-ice and the resultant precipitate is filtered off and washed to give methyl 7-methylsulfinylxanthone-2-carboxylate.

The foregoing procedure is repeated using the alternate lower alkyl iodides so as to prepare the corresponding lower alkyl acid esters hereof, e.g.

ethyl 7-methylsulfinylxanthone-2-carboxylate,
n-propyl 7-methylsulfinylxanthone-2-carboxylate,
isopropyl 7-methylsulfinylxanthone-2-carboxylate,
n-propyl 7-methylsulfinylxanthone-2-carboxylate,
isobutyl 7-methylsulfinylxanthone-2-carboxylate,
sec-butyl 7-methylsulfinylxanthone-2-carboxylate,
t-butyl 7-methylsulfinylxanthone-2-carboxylate,
n-pentyl 7-methylsulfinylxanthone-2-carboxylate, and so forth.

In like manner, the other xanthone-2-carboxylic acids hereof containing substituents at the C–5 or C–7 positions, prepared as described above, can be converted to the corresponding acid esters, e.g. methyl 7-methylsulfonylxanthone-2 - carboxylate, ethyl 5 - methylsulfonylxanthone-2-carboxylate, n-propyl 7-sulfamoylxanthone-2-carboxylate, and so forth.

In the sulfo series, the esters are prepared by treating the acid with the appropriate lower alkanol under reflux and in the absence of acid to give, e.g. methyl 7-sulfoxanthone - 2 - carboxylate and ethyl 5 - sulfoxanthone - 2-carboxylate.

EXAMPLE 14

To a solution of 10 g. of 7-methylsulfinylxanthone-2-carboxylic acid in 200 ml. of ethanol is added the theoretical amount of sodium hydroxide dissolved in 200 ml. of 90% ethanol. The reaction mixture is then concentrated in vacuum to give sodium 7 - methylsulfinyl xanthone-2-carboxylate.

In a similar manner, the potassium and lithium salts are prepared. Similarly, by replacing the sodium salt by means of an appropriate metal salt reagent, e.g. calcium chloride, manganese chloride, and so forth, the other xanthone-2-carboxylic acid salts are prepared, e.g.

magnesium 7-methylsulfinylxanthone-2-carboxylate,
calcium 7-methylsulfinylxanthone-2-carboxylate,
aluminum 7-methylsulfinylxanthone-2-carboxylate,
ferrous 7-methylsulfinylxanthone-2-carboxylate,
zinc 7-methylsulfinylxanthone-2-carboxylate,
manganese 7-methylsulfinylxanthone-2-carboxylate,
ferric 7-methylsulfinylxanthone-2-carboxylate, and so forth.

In a similar manner, the xanthone-2-carboxylic acid salts of the other C–5 or C–7 substituted xanthone-2-carboxylic acids hereof are prepared, e.g. potassium 5-methylsulfonylxanthone - 2 - carboxylate, sodium 7 - sulfamoylxanthone-2-carboxylate, and so forth.

In the sulfo series, use of one equivalent of base provides the sulfo acid salt and use of two or more equivalents provides the disalt, e.g. 7-sulfoxanthone-2-carboxylic acid disodium salt.

EXAMPLE 15

To a mixture of 50 ml. of concentrated aqueous ammonia in 500 ml. of methanol there are added 20 g. of 7-sulfamoylxanthone-2-carboxylic acid. The resultant mixture is stirred for 2 hours and is then evaporated to dryness to give the ammonium salt of 7-sulfamoylxanthone-2-carboxylic acid.

A solution of 10 g. of 7-sulfamoylxanthone-2-carboxylic acid in 50 ml. of thionyl chloride is heated at reflux for one hour. Thereafter, the solution is evaporated to dryness to give the corresponding acid chloride to which is added a concentrated ethereal ammonia solution. The resultant solution is evaporated giving the 7-sulfamoyl-xanthone-2-carboxylic acid amide.

In like manner, the lower alkyl amides can be prepared using monoalkylamine or dialkylamine in lieu of ammonia in the above procedures. Thus prepared, e.g. are:

7-methylsulfamoylxanthone-2-carboxylic acid amide,
N-methyl 7-n-propylsulfinylxanthone-2-carboxylic acid amide,
N,N-dimethyl 5-dimethylsulfamoylxanthone-2-carboxylic acid amide,
N,N-diethyl 7-ethylsulfonylxanthone-2-carboxylic acid amide,
N-ethyl 7-sulfoxanthone-2-carboxylic acid amide,
N - n-propyl 7-propylsulfinylxanthone-2-carboxylic acid amide, and so forth.

EXAMPLE 16

To a mixture of 20 g. of procaine and 500 ml. of aqueous methanol are added 20 g. of 7-methylsulfinylxanthone 2-carboxylic acid. The resultant mixture is stirred at room temperature for 16 hours. It is then evaporated under reduced pressure, to give the procaine salt of 7-methylsulfinylxanthone-2-carboxylic acid.

Similarly, the lysine, caffeine, and arginine salts thereof are obtained. In like manner, the e.g. procaine, lysine, caffeine, and arginine salts of the other 5- and 7-substituted xanthone-2-carboxylic acids are obtained, e.g. the procaine salt of 7-ethylsulfonylxanthone-2-carboxylic acid, the caffeine salt of 5-propylsulfinylxanthone-2-carboxylic acid, the lysine salt of 7-di-t-butylsulfamoylxanthone-2-carboxylic acid, the procaine salt of 5-sec-butylsulfinylxanthone-2-carboxylic acid, and the arginine salt of 7-sulfoxanthone-2-carboxylic acid.

EXAMPLE 17

The following procedures illustrate the method by which the pharmaceutical compositions of the compounds hereof are prepared.

Sodium chloride (0.44 g.) is dissolved in 80 ml. of a (9.47 g./l. water) sodium hydrogen phosphate solution. A sodium dihydrogen phosphate (8.00 g./l. water) solution (20 ml.) is then added thereto. The resultant solution having a pH of 7.38 is sterilized in an autoclave. This vehicle is then added to solid, dry 7-methylsulfinylxanthone-2-carboxylic acid to give a preparation suitable for intravenous injection containing 2.5 mg. of 7-methylsulfinylxanthone-2-carboxylic acid per ml. of total composition.

EXAMPLE 18

The following procedure illustrates a test procedure for the compounds hereo.

Normal female (Sprague-Dawley) rats of 150 to 200 grams each are passively sensitized intradermally by injection of rat anti-egg albumin reaginic sera. After 24 hours, each rat is challenged intravenously with 1 ml. of 0.5% Evans blue, 1 mg. egg albumin plus 0.20 mg. of 7-methylsulfinylxanthone-2-carboxylic acid. Control rats receive no 7-methylysulfinylxanthone-2-carboxylic acid. The dermal bluing is recorded 15 to 25 minutes later. The rats which receive the 7-methylsulfinylxanthone-2-carboxylic acid exhibit a 100 percent inhibition of allergic reaction whereas the control rats exhibit no inhibition.

The above procedure is repeated using 7-methylsulfonylxanthone-2-carboxylic acid, with similar results. The above procedure is repeated using oral administration, with similar results.

The C-5 and C-7 substituted xanthone-2-carboxylic acid compounds are administered by gavage at a dose of 5 mg. per animal 15 minutes prior to challenge. Twenty to thirty minutes after challenge the degree of dermal bluing is read, with similar results.

Inhibition of reaginic antigen-antibody reactions in rats is regarded as representative of inhibition of human reagenic antigen-antibody reactions which occur during allergic episodes.

Subjects challenged by antigen inhalation are measured for the extent of provoked degree of asthma condition by changes in airway resistance on expiration. The subject compounds are administered as an aerosol by inhalation before antigen challenge. Prevention of asthmatic conditions upon the administration of the compounds is evidenced by a decrease in airway resistance and other, subjective improvements, e.g. reduced cough.

What is claimed is:

1. A compound selected from those represented by the following formulas:

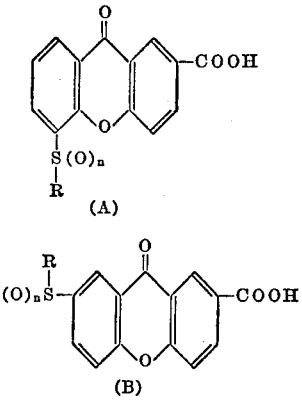

and the pharmaceutically acceptable, non-toxic lower alkyl esters, unsubstituted, mono(lower)alkyl, or di (lower)alkyl substituted amides and salts thereof; wherein $n$ is the integer 1 or 2; R is lower alkyl when $n$ is 1; and R is lower alkyl, hydroxy, amino, monoloweralkylamino, or di(lower)alkylamino when $n$ is 2.

2. The compound according to claim 1 of Formula A.
3. The compound according to claim 2 wherein $n$ is 1 and R is lower alkyl.
4. The compound according to claim 3 wherein R is methyl.
5. The compound according to claim 1 of Formula B.
6. The compound according to claim 5 wherein $n$ is 1 and R is lower alkyl.
7. The compound according to claim 6 wherein R is methyl.
8. The compound according to claim 5 wherein $n$ is 2 and R is lower alkyl.
9. The compound according to claim 8 wherein R is methyl.
10. The compound according to claim 5 wherein $n$ is 2 and R is hydroxy.
11. The compound according to claim 5 wherein $n$ is 2 and R is amino, monolower alkylamino, or dilower alkylamino.
12. The compound according to claim 11 wherein R is amino.
13. The compound according to claim 11 wherein R is dimethylamino.
14. The compound according to claim 11 wherein R is diethylamino.
15. The acid compound according to claim 5 wherein $n$ is 1 and R is methyl; 7-methylsulfinylxanthone-2-carboxylic acid.
16. The acid compound according to claim 5 wherein $n$ is 1 and R is ethyl; 7-ethylsulfinylxanthone-carboxylic acid.
17. The acid compound according to claim 5 wherein $n$ is 2 and R is methyl; 7-methylsulfonylxanthone-2-carboxylic acid.
18. The acid compound according to claim 5 wherein $n$ is 2 and R is ethyl; 7-ethylsulfonylxanthone-2-carboxylic acid.

19. The acid compound according to claim 5 wherein $n$ is 2 and R is hydroxy; 7-sulfoxanthone-2-carboxylic acid.

20. The acid compound according to claim 5 wherein $n$ is 2 and R is amino; 7-sulfamoylxanthone-2-carboxylic acid.

21. The acid compound according to claim 5 wherein $n$ is 2 and R is dimethylamino; 7-dimethylsulfamoylxanthone-2-carboxylic acid.

22. The acid compound according to claim 5 wherein $n$ is 2 and R is diethylamino; 7-diethylsulfamoylxanthone-2-carboxylic acid.

23. The sodium salts of the compounds according to claim 1.

24. The salts according to claim 23 of Formula B.

25. The compound according to claim 24 wherein $n$ is 1 and R is methyl; sodium 7-methylsulfinylxanthone-2-carboxylate.

References Cited
UNITED STATES PATENTS
3,706,768   12/1972   Bays _____ 260—335

NORMA S. MILESTONE, Primary Examiner

U.S. Cl. X.R.

424—283